United States Patent
Nobuoka et al.

(10) Patent No.: US 9,792,480 B2
(45) Date of Patent: Oct. 17, 2017

(54) IMAGE RECOGNITION APPARATUS, COMMODITY INFORMATION PROCESSING APPARATUS AND IMAGE RECOGNITION METHOD

(71) Applicant: TOSHIBA TEC KABUSHIKI KAISHA, Tokyo (JP)

(72) Inventors: Tetsuya Nobuoka, Sunto Shizuoka (JP); Masaaki Yasunaga, Sunto Shizuoka (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/581,861

(22) Filed: Dec. 23, 2014

(65) Prior Publication Data

US 2016/0180191 A1    Jun. 23, 2016

(51) Int. Cl.
| | |
|---|---|
| *G06K 9/48* | (2006.01) |
| *G06K 9/00* | (2006.01) |
| *G07G 1/00* | (2006.01) |
| *G06Q 20/20* | (2012.01) |

(52) U.S. Cl.
CPC .............. *G06K 9/00* (2013.01); *G06Q 20/208* (2013.01); *G07G 1/0063* (2013.01); *G06K 2209/17* (2013.01)

(58) Field of Classification Search
None
See application file for complete search history.

(56) References Cited

U.S. PATENT DOCUMENTS

| | | | |
|---|---|---|---|
| 5,540,301 A | 7/1996 | Dumont | |
| 7,100,824 B2 * | 9/2006 | Ostrowski | ............... A47F 9/045 235/383 |
| 9,064,161 B1 * | 6/2015 | Boman | .................... G06K 7/01 |
| 2006/0147087 A1 | 7/2006 | Goncaives et al. | |

(Continued)

FOREIGN PATENT DOCUMENTS

JP    2009-289286 A    12/2009

OTHER PUBLICATIONS

Park, Nohyoung, Wonwoo Lee, and Woontack Woo. "Barcode-assisted planar object tracking method for mobile augmented reality." Ubiquitous Virtual Reality (ISUVR), 2011 International Symposium on. IEEE, 2011. 4 pages.*

(Continued)

*Primary Examiner* — Ryan P Potts
(74) *Attorney, Agent, or Firm* — Patterson & Sheridan, LLP

(57) ABSTRACT

An image recognition apparatus includes an acquisition unit and a controller. The acquisition unit acquires an image which captures by photography a pattern indicative of an object. The controller is configured to specify a pattern area from a first image which the acquisition unit acquires, to recognize a pattern which the specified pattern area includes, to acquire a second image from the acquisition unit, to determine whether a disposition of the object of the first image and a disposition of the object of the second image coincide, and to specify a pattern area from the second image, if determining that the disposition of the object of the first image and the disposition of the object of the second image are non-coincident, and to recognize a pattern which the specified pattern area includes.

10 Claims, 10 Drawing Sheets

(56) References Cited

U.S. PATENT DOCUMENTS

| | | | |
|---|---|---|---|
| 2010/0019042 A1* | 1/2010 | Barkan | G06K 7/10683 |
| | | | 235/462.41 |
| 2010/0320273 A1 | 12/2010 | Iizaka et al. | |
| 2011/0180596 A1* | 7/2011 | Iizaka | G06Q 20/387 |
| | | | 235/375 |
| 2011/0220720 A1* | 9/2011 | Naito | G06K 7/1456 |
| | | | 235/454 |
| 2012/0018515 A1* | 1/2012 | Kakino | G06K 7/1465 |
| | | | 235/454 |
| 2012/0048920 A1 | 3/2012 | Iizaka | |
| 2012/0048933 A1* | 3/2012 | Hasegawa | G07G 1/0045 |
| | | | 235/438 |
| 2012/0106784 A1* | 5/2012 | Cho | G06T 7/246 |
| | | | 382/103 |
| 2012/0261473 A1* | 10/2012 | Bombaugh | G06K 7/10603 |
| | | | 235/462.11 |
| 2013/0020392 A1* | 1/2013 | Olmstead | G06K 7/10722 |
| | | | 235/440 |
| 2013/0058530 A1 | 3/2013 | Naito et al. | |
| 2014/0140574 A1 | 5/2014 | Takeno | |

OTHER PUBLICATIONS

White, Michelle. "How are QR Codes Better Than Barcodes." Mobile-QR-Codes.org. Mar. 31, 2013. Web. Oct. 17, 2015. <https://web.archive.org/web/20130331030831/http://www.mobile-qr-codes.org/about.html>. 4 pages.*

Extended European Search Report dated May 4, 2016, mailed in counterpart European Application No. 15189142.1, 8 pages.

* cited by examiner

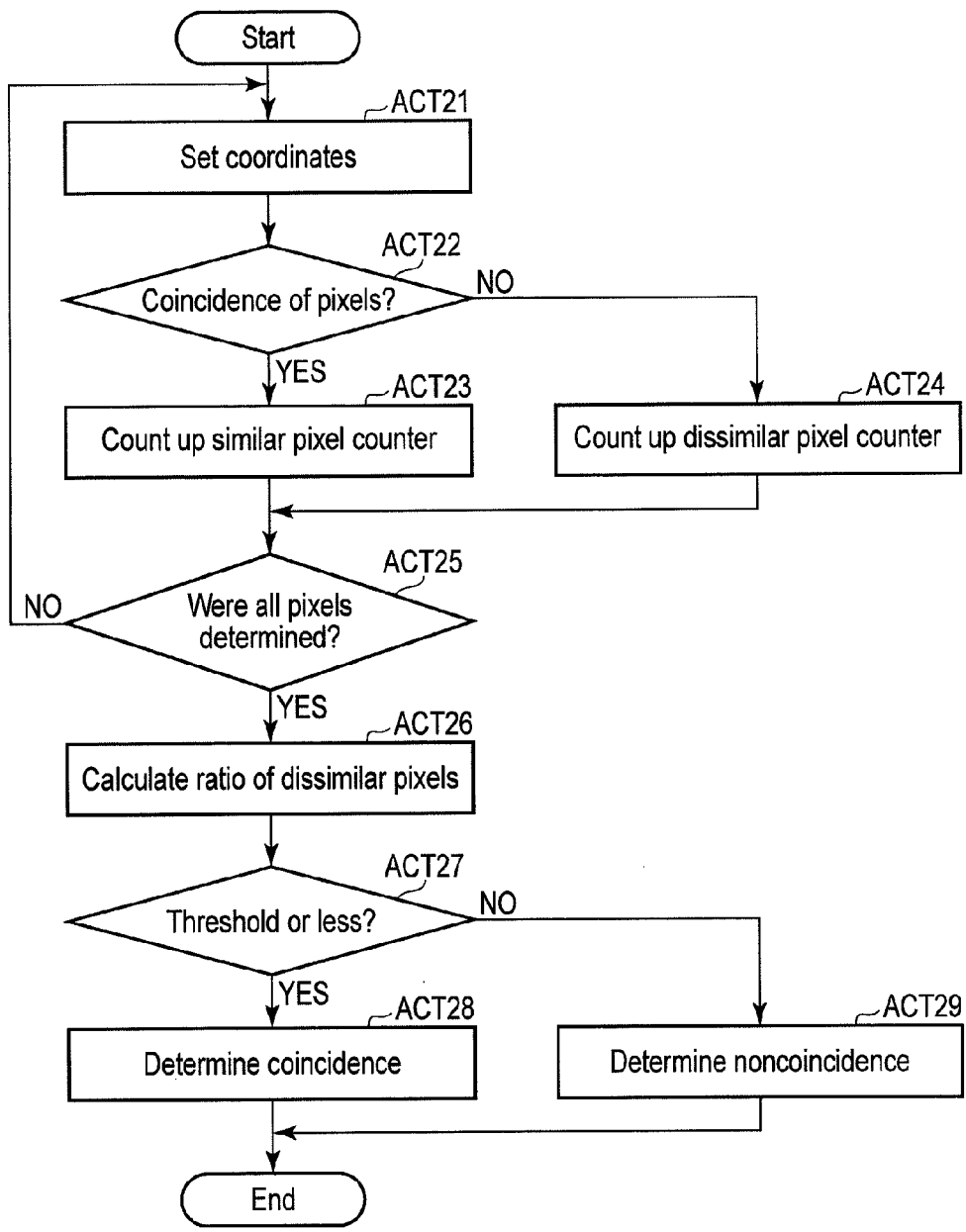
F I G. 5

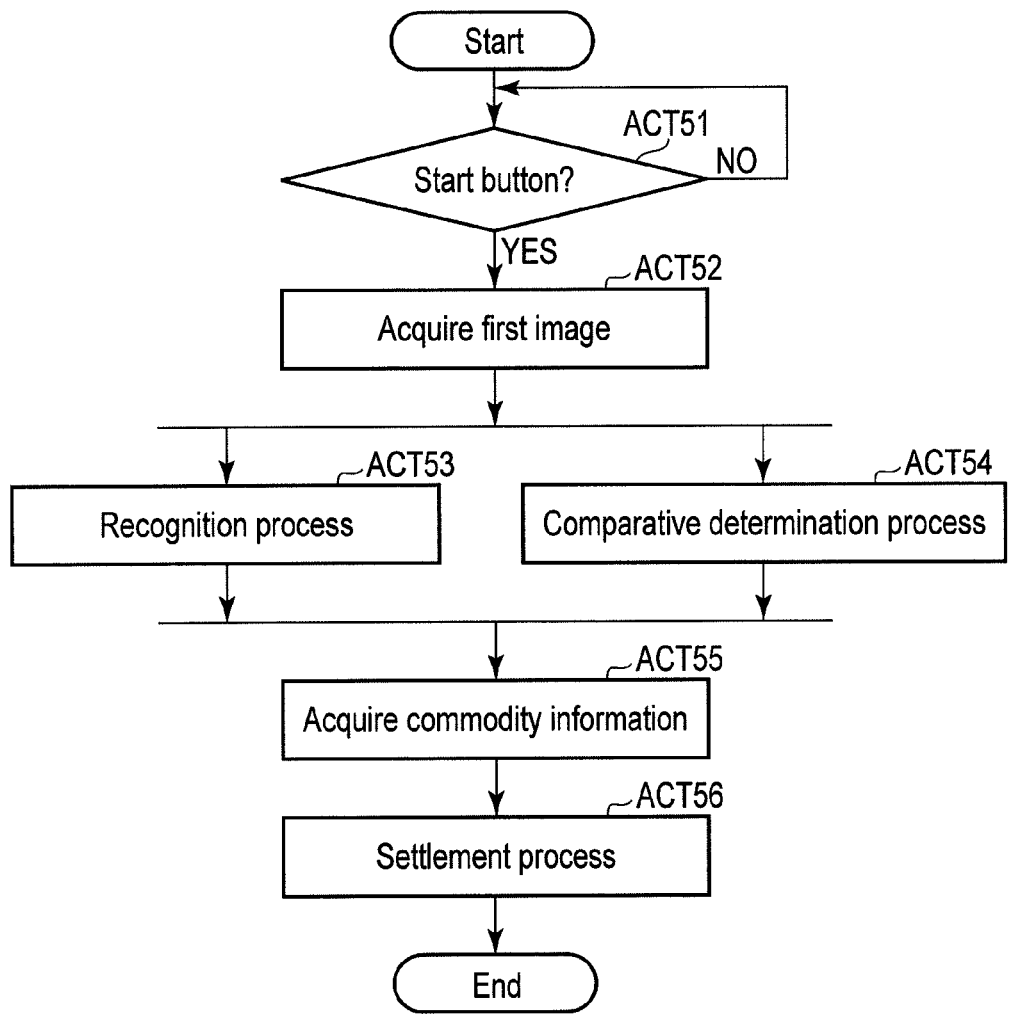
F I G. 7

IMAGE RECOGNITION APPARATUS, COMMODITY INFORMATION PROCESSING APPARATUS AND IMAGE RECOGNITION METHOD

FIELD

Embodiments described herein relate generally to an image recognition apparatus, a commodity information processing apparatus and an image recognition method.

BACKGROUND

An image recognition apparatus, which recognizes a commodity from an image that a camera photographs, photographs an image after a commodity is set at a predetermined position, and recognizes the commodity by using the photographed image. While the image recognition apparatus is executing a recognition process, there may be a case in which a user adds a commodity or moves a commodity. In this case, such a problem arises that the image recognition apparatus cannot recognize a commodity after a change.

OBJECT OF INVENTION

In order to solve the above problem, there are provided an image recognition apparatus, a commodity information processing apparatus and an image recognition method, which can properly recognize a target object changed during the recognition process.

BRIEF DESCRIPTION OF THE DRAWINGS

FIG. 5 is a flowchart illustrating an operation example of the commodity information processing apparatus of the first embodiment.

FIG. 7 is a flowchart illustrating an operation example of a commodity information processing apparatus according to a third embodiment.

DETAILED DESCRIPTION

In general, according to one embodiment, an image recognition apparatus includes an acquisition unit and a controller. The acquisition unit acquires an image which captures by photography a pattern indicative of an object. The controller is configured to specify a pattern area from a first image which the acquisition unit acquires, to recognize a pattern which the specified pattern area includes, to acquire a second image from the acquisition unit, to determine whether a disposition of the object of the first image and a disposition of the object of the second image coincide, and to specify a pattern area from the second image, if determining that the disposition of the object of the first image and the disposition of the object of the second image are noncoincident, and to recognize a pattern which the specified pattern area includes.

Various embodiments will be described hereinafter with reference to the accompanying drawings.

First Embodiment

To begin with, a commodity information processing apparatus (image recognition apparatus) according to a first embodiment is described.

Figure 1:
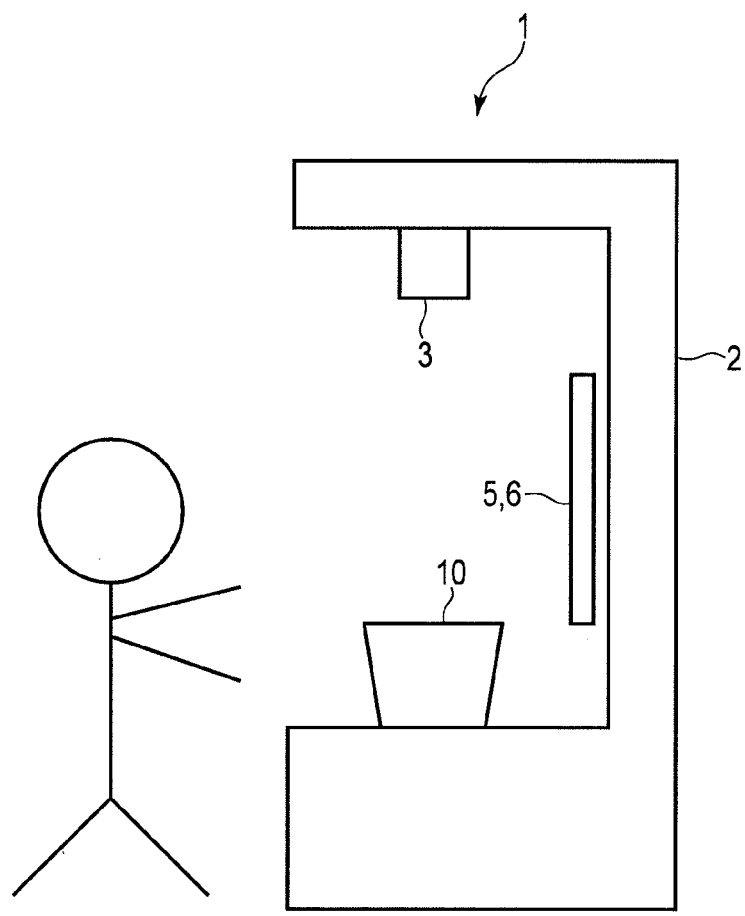
FIG. 1 is a view which schematically illustrates a structure example of a commodity information processing apparatus according to a first embodiment.

FIG. 1 schematically illustrates a structure example of a commodity information processing apparatus 1 according to the first embodiment.

The commodity information processing apparatus 1 executes a settlement process with respect to a commodity in a basket 10. The commodity information processing apparatus 1 is installed, for example, in a store which sells goods. When the basket 10 is disposed at a predetermined position, the commodity information processing apparatus 1 executes a settlement process with respect to a commodity in the basket 10. The commodity information processing apparatus 1 may be installed as a self-checkout system by which a user performs a settlement process by himself/herself. In addition, the commodity information processing apparatus 1 may be installed as an ordinary cash register by which a salesclerk of the store performs a settlement process.

The commodity information processing apparatus 1 recognizes a commodity, based on a pattern which identifies the commodity (object). A commodity in the basket 10 includes a pattern which identifies the commodity. The pattern which identifies the commodity is, for instance, a bar code, a QR code, a character, a numeral, or a mark. The commodity information processing apparatus 1 may also recognize the commodity by object recognition (recognition of the pattern of the commodity itself). In this example, it is assumed that the pattern which identifies the commodity is a bar code.

As illustrated in FIG. 1, the commodity information processing apparatus 1 includes a housing 2, a camera 3, a display unit 5, and an operation unit 6.

The housing 2 is a frame which forms the outer shape of the commodity information processing apparatus 1. The housing 2 is formed such that the basket 10 can be disposed. In the example illustrated in FIG. 1, the housing 2 has a square bracket (]) shape, and is formed such that the basket 10 can be placed.

In addition, the housing 2 stores therein a controller such as a CPU.

The camera 3 photographs a commodity in the basket 10. In the example illustrated in FIG. 1, the camera 3 is disposed in a manner to photograph the basket 10 from above. The camera 3 may be disposed in a manner to photograph the inside of the basket 10 obliquely from above. The position and direction for disposition of the camera 3 are not restricted to a specific configuration.

Incidentally, the commodity information processing apparatus 1 may include a plurality of cameras 3. In this case, the plural cameras 3 may be disposed in a manner to photograph the commodity in the basket 10 at different positions and angles.

The camera 3 is, for instance, a CCD camera. In addition, the camera 3 may be a camera which is configured to photograph invisible light. The structure of the camera 3 is not restricted to a specific structure.

The display unit 5 is a display device which displays various information by the control of the controller. The display unit 5 is, for example, a liquid crystal monitor.

The user of the commodity information processing apparatus 1 inputs various operational instructions to the operation unit 6. The operation unit 6 sends the data of the operational instructions, which are input by the operator, to the controller. The operation unit 6 is, for instance, a keyboard, numeral keys, and a touch panel. In addition, the operation unit 6 may accept an input of a gesture from the user.

In this example, it is assumed that the operation unit 6 is a touch panel and is formed integral with the display unit 5.

Incidentally, the camera 3, display unit 5 or operation unit 6 may be formed integral with the housing 2.

In addition, where necessary, the commodity information processing apparatus 1 may include some other structure such as an illuminator, or may not include the above-described structure. For example, if the commodity information processing apparatus 1 automatically starts a recognition process upon the user placing the basket 10, and executes a settlement by pre-registered credit card information, the commodity information processing apparatus 1 may dispense with the display unit 5 or/and the operation unit 6.

Next, a structure example of the commodity information processing apparatus 1 is described.

Figure 2:
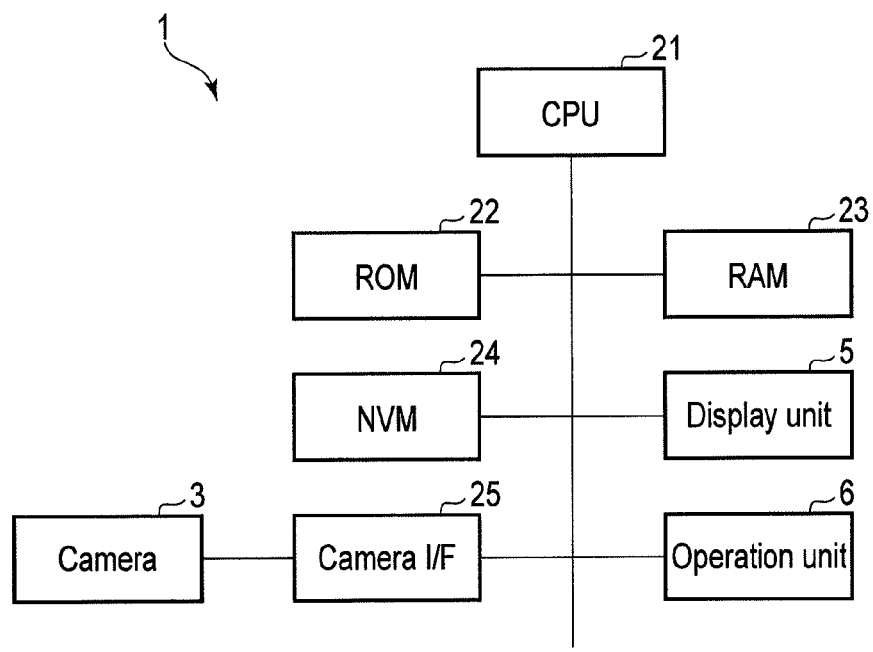
FIG. 2 is a block diagram illustrating a structure example of the commodity information processing apparatus of the first embodiment.

FIG. 2 is a block diagram illustrating a structure example of the commodity information processing apparatus 1.

As illustrated in FIG. 2, the commodity information processing apparatus 1 includes the camera 3, display unit 5, operation unit 6, a CPU 21, a ROM 22, a RAM 23, an NVM 24, and a camera interface 25.

The camera 3, display unit 5 and operation unit 6 are as described above.

The CPU 21 is a controller which executes overall control of the commodity information processing apparatus 1. The CPU 21 executes various processes, based on control programs or control data stored in the ROM 22 or NVM 24. For example, by executing the programs stored in the ROM 22, the CPU 21 executes operation control of the commodity information processing apparatus 1, or various processes corresponding to operation modes of the commodity information processing apparatus 1.

A part of various functions may be realized by a hardware circuit. In this case, the CPU 21 controls the function which is executed by the hardware circuit.

The ROM 22 is a nonvolatile memory which prestores programs for control, and control data. The ROM 22 is built in the commodity information processing apparatus 1 in the state in which the ROM 22 stores the control programs and control data at a stage of manufacture. Specifically, the control programs and control data, which are stored in the ROM 22, are pre-installed in accordance with the specifications of the commodity information processing apparatus 1.

The RAM 23 is a volatile memory. The RAM 23 temporarily stores, e.g. data which is being processed by the CPU 21. The RAM 23 stores various application programs, based on instructions from the CPU 21. In addition, the RAM 23 may store data necessary for the execution of the application programs, and execution results of the application programs.

The NVM 24 is composed of, for example, a nonvolatile memory which is capable of data write and data rewrite, such as an EEPROM or a flash ROM. The NVM 24 stores control programs, applications and various data in accordance with purposes of operational use of the commodity information processing apparatus 1. For example, in the NVM 24, program files and data files are created. Control programs and various data are written in the respective created files.

The camera interface 25 is an interface through which the CPU 21 communicates with the camera 3. The camera interface 25 (corresponding to an acquisition unit) acquires an image which is photographed by the camera 3. Specifically, the CPU 21 acquires the image photographed by the camera 3, through the camera interface 25.

Next, the functions which the CPU 21 realizes are described.

To begin with, the CPU 21 includes a function of acquiring a commodity image (first image) including a bar code (pattern) indicative of a commodity in the basket 10. The commodity image includes the bar code (pattern) for identifying the commodity. For example, the CPU 21 photographs the commodity in the basket 10 by using the camera 3, and acquires the commodity image (first image). Incidentally, the CPU 21 may acquire a commodity image (first image) from an external apparatus.

Figure 3:
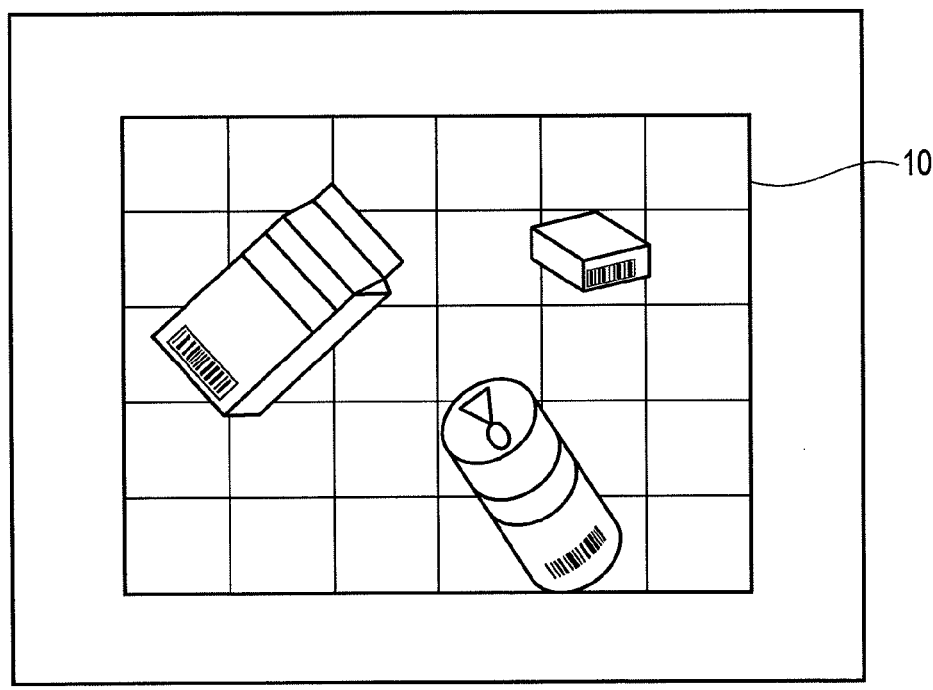
FIG. 3 is a view illustrating an example of an image which the commodity information processing apparatus of the first embodiment photographed.

FIG. 3 illustrates an example of a commodity image which the CPU 21 acquires.

As illustrated in FIG. 3, the commodity image is an image which photographs the inside from above. In addition, bar codes of commodities included in the commodity image face upward such that the camera 3 can photograph the bar codes.

In the example illustrated in FIG. 3, the basket 10 includes three commodities, but the number of commodities in the basket 10 is not limited to a predetermined number. Besides, the commodity image may include a bar code of a commodity which is not stored in the basket 10.

In addition, the CPU 21 includes a function of specifying, from the commodity image (first image), a bar code area (pattern area) in which the bar code (pattern) that identifies the commodity is photographed. For example, the CPU 21 executes raster scan, which uses, e.g. pattern matching, on the commodity image, and specifies the bar code area. Incidentally, the method in which the CPU 21 specifies the bar code area is not restricted to a specific method.

Furthermore, the CPU 21 includes a function of recognizing the bar code (pattern) which the bar code area (pattern area) includes. For example, the CPU 21 decodes the bar code which the bar code area includes. In addition, if the pattern area includes a character string as a pattern, the CPU 21 executes, e.g. an OCR process on the pattern area, and recognizes the pattern. The method in which the CPU 21 recognizes the pattern is not restricted to a specific method.

Additionally, the CPU 21 includes a function of acquiring once again a commodity image (second image) including the bar code (pattern) indicative of the commodity in the basket 10, after the CPU 21 recognized the bar code (pattern). For example, the CPU 21 photographs the commodity in the basket 10 by using the camera 3, and acquires the commodity image (second image). Incidentally, the CPU 21 may acquire the commodity image (second image) from an external device.

Moreover, the CPU 21 includes a function of determining whether the disposition of the commodity of the first image and the disposition of the commodity of the second image coincide or not.

For example, the CPU 21 determines whether the first image and the second image coincide or not. For example, the CPU 21 determines whether the first image and the second image coincide or not, based on a similar pixel or a dissimilar pixel. In this example, the CPU 21 determines whether the first image and the second image coincide or not, in the following manner.

To begin with, the CPU 21 calculates an absolute value of a difference between a pixel value of the first image and a pixel value of the second image at each of coordinates. If the calculated absolute value is a threshold or less, the CPU 21 determines that the pixels at the coordinate are similar pixels. In addition, if the absolute value calculated at the pixels is greater than the threshold, the CPU 21 determines that the pixels are dissimilar pixels. As regards the number of pixels of the first image or second image, if the ratio of dissimilar pixels is a predetermined threshold or less, the CPU 21 determines that the first image and the second image coincide. In addition, as regards the number of pixels of the first image or second image, if the ratio of dissimilar pixels is not the predetermined threshold or less, the CPU 21 determines that the first image and the second image are noncoincident.

Incidentally, the method, in which the CPU 21 determines whether the disposition of the commodity of the first image and the disposition of the commodity of the second image coincide or not, is not restricted to a specific method.

In addition, the CPU 21 includes a function of specifying, when the CPU 21 determined that the disposition of the commodity of the first image and the disposition of the commodity of the second image do not coincide, a bar code area, in which the bar code identifying the commodity is photographed, from the second image, and recognizing the bar code which the specified bar code area includes. The method in which the CPU 21 specifies the bar code area from the second image is the same as the method in which the CPU 21 specifies the bar code area from the first image. In addition, the method in which the CPU 21 recognizes the bar code, which the bar code area of the second image includes, is the same as the method in which the CPU 21 recognizes the bar code which the bar code area of the first image includes.

Furthermore, the CPU 21 includes a function of acquiring commodity information corresponding to a decoded result of decoding of the bar code which the bar code area includes. For example, the CPU 21 decodes the bar code and acquires a commodity code as a decoded result. The CPU 21 acquires commodity information corresponding to the commodity code decoded from the bar code.

For example, the NVM 24 may store a commodity table which associates commodity codes and commodity information, and the CPU 21 may acquire commodity information by referring to the commodity table. In addition, an upper-level apparatus of the commodity information processing apparatus 1 may store a commodity table, and the CPU 21 may acquire commodity information corresponding to the commodity code from the upper-level apparatus through, e.g. a communication unit.

The commodity information includes a commodity name and a price. The structure of the commodity information is not restricted to a specific structure.

Besides, the CPU 21 includes a function of executing a settlement process, based on the acquired commodity information. For example, the CPU 21 calculates a settlement amount, based on the commodity information, and accepts a settlement process from the user. For example, the CPU 21 may execute the settlement process by using a credit card, or may execute the settlement process by using cash.

Next, an operation example of the commodity information processing apparatus 1 is described.

Figure 4:
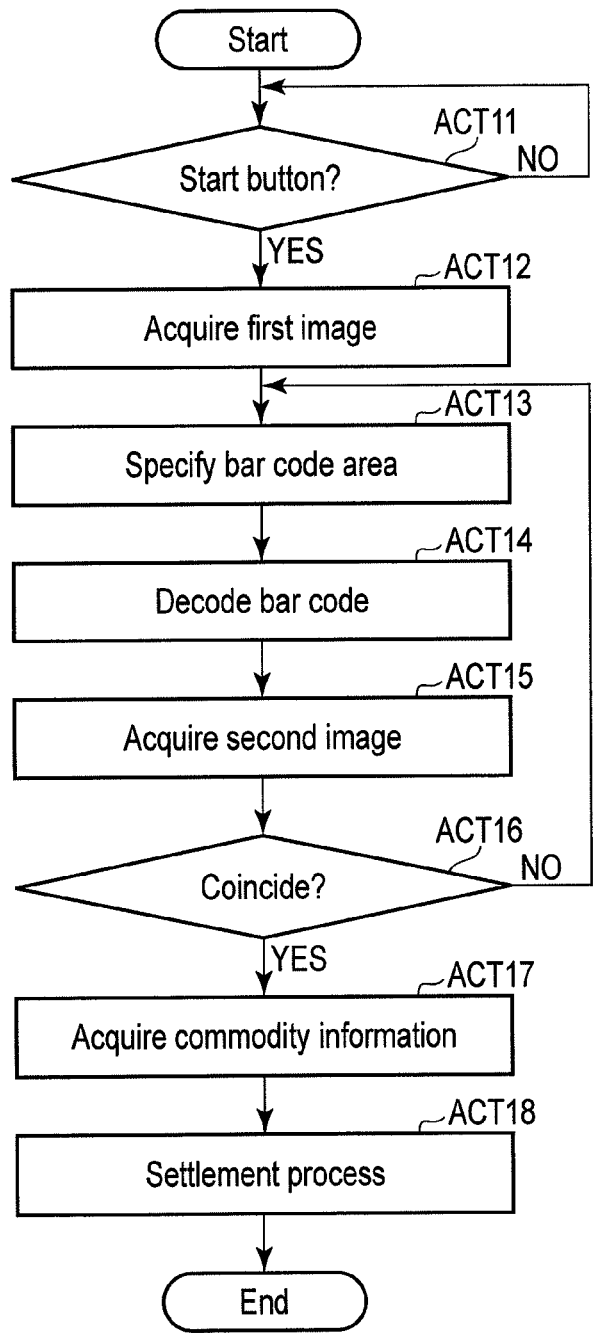
FIG. 4 is a flowchart illustrating an operation example of the commodity information processing apparatus of the first embodiment.

FIG. 4 is a flowchart for describing an operation example of the commodity information processing apparatus 1.

In this example, it is assumed that the user placed commodities in the basket 10 such that the bar code areas face upward. It is also assumed that the user disposes the basket 10 at such a predetermined position that the camera 3 can photograph the commodities in the basket 10.

To start with, the CPU 21 determines whether a start button was pressed (ACT 11). The start button is a button for starting a settlement process with respect to the commodities in the basket 10. The start button may be an icon displayed on the display unit 5, or some other operation unit.

If the CPU 21 determines that the start button is not pressed (ACT 11, NO), the CPU 21 returns to ACT 11.

If the CPU 21 determines that the start button was pressed (ACT 11, YES), the CPU 21 photographs the inside of the basket 10 by using the camera 3, and acquires a first image (ACT 12).

Upon acquiring the first image, the CPU 21 specifies a bar code area from the acquired first image (ACT 13). Upon specifying the bar code area, the CPU 21 decodes a bar code which the specified bar code area includes (ACT 14).

Upon decoding the bar code, the CPU 21 photographs the inside of the basket 10 by using the camera 3, and acquires a second image (ACT 15).

Upon acquiring the second image, the CPU 21 determines whether the first image acquired in ACT 12 and the second image acquired in ACT 15 coincide (ACT 16).

If the CPU 21 determines that the first image and the second image do not coincide (ACT 16, NO), the CPU 21 returns to ACT 13. In this case, the CPU 21 specifies a bar code area on the second image in ACT 13. In addition, the CPU 21 decodes in ACT 14 a bar code which the bar code area specified from the second image includes. Further, the CPU 21 acquires a third image in ACT 15. In ACT 16, the CPU 21 determines whether the second image and the third image coincide. If the second image and the third image do not coincide, the CPU 21 returns to ACT 13, and repeats the same operation.

Incidentally, the CPU 21 may return to ACT 12, and may acquire a second image once again.

If the CPU 21 determines that the first image and the second image coincide (ACT 16, YES), the CPU 21 acquires commodity information corresponding to the decoded result of the decoding of the bar code (ACT 17). Specifically, the CPU 21 acquires commodity information corresponding to the bar code which the bar code area of the first image or second image includes.

Upon acquiring the commodity information, the CPU 21 executes a settlement process, based on the acquired commodity information (ACT 18).

After executing the settlement process, the CPU 21 terminates the operation.

In the meantime, the CPU 21 may determine whether the first image and the second image coincide, after acquiring the commodity information.

In addition, if the second image and the third image do not coincide, the CPU 21 may issue a notification that the CPU 21 failed in the recognition process of the bar code.

Besides, when the CPU 21 determined a predetermined number of times in ACT 16 that the images do not coincide, the CPU 21 may issue a notification that the CPU 21 cannot detect the bar code.

Next, a description is given of a determination process (ACT 16) in which the CPU 21 determines whether the first image and the second image coincide or not.

FIG. 5 is a flowchart for describing an operation example of the determination process.

In this example, it is assumed that the CPU 21 sets in the RAM 23 a similar pixel counter which counts the number of similar pixels, and a dissimilar pixel counter which counts the number of dissimilar pixels.

To start with, the CPU 21 sets coordinates of pixels which are compared in the first image and second image (ACT 21). Specifically, the CPU 21 sets coordinates indicative of pixels which are yet to be compared.

Upon setting the coordinates, the CPU 21 determines whether a pixel of the first image and a pixel of the second image coincide in the set coordinates (ACT 22). Specifically, the CPU 21 determines whether the absolute value of a difference between both pixel values is a predetermined threshold or less.

If the CPU 21 determines that both pixels coincide (ACT 22, YES), the CPU 21 counts up the similar pixel counter (ACT 23). If the CPU 21 determines that both pixels do not coincide (ACT 22, NO), the CPU 21 counts up the dissimilar pixel counter (ACT 24).

When the CPU 21 counted up the similar pixel counter (ACT 23) or counted up the dissimilar pixel counter (ACT 24), the CPU 21 determines whether the determination of coincidence/noncoincidence of pixels at all coordinates was finished (ACT 25).

If the CPU 21 determines that the determination of coincidence/noncoincidence of pixels at all coordinates is not finished (ACT 25, NO), the CPU 21 returns to ACT 21.

If the CPU 21 determines that the determination of coincidence/noncoincidence of pixels at all coordinates was finished (ACT 25, YES), the CPU 21 calculates the ratio of dissimilar pixels, based on the similar pixel counter or dissimilar pixel counter (ACT 26).

Upon calculating the ratio of dissimilar pixels, the CPU 21 determines whether the calculated ratio of dissimilar pixels is a predetermined threshold or less (ACT 27).

If the CPU 21 determines that the ratio of dissimilar pixels is the predetermined threshold or less (ACT 27, YES), the CPU 21 determines that the first image and the second image coincide (ACT 28).

If the CPU 21 determines that the ratio of dissimilar pixels is not the predetermined threshold or less (ACT 27, NO), the CPU 21 determines that the first image and the second image do not coincide (ACT 29).

If the CPU 21 determines that the first image and the second image coincide (ACT 28) or if the CPU 21 determines that the first image and the second image do not coincide (ACT 29), the CPU 21 terminates the operation.

Incidentally, the CPU 21 may count either the number of similar pixels or the number of dissimilar pixels.

The commodity information processing apparatus with the above-described structure can determine a change of disposition of a commodity or the presence/absence of addition of a commodity, after the recognition process of the bar code. When the disposition of a commodity was changed or a commodity was added, the commodity information processing apparatus can execute once again the recognition process of the bar code. As a result, the commodity information processing apparatus can obtain a bar code recognition result which the user intends to have.

Second Embodiment

Next, a second embodiment is described.

A commodity information processing apparatus 1 according to the second embodiment differs from the commodity information processing apparatus 1 of the first embodiment in that the commodity information processing apparatus 1 of the second embodiment executes a bar code recognition process on a noncoincident part between the first image and second image. Accordingly, the other points are denoted by the same reference numerals and a detailed description is omitted.

To begin with, functions which the CPU 21 realizes are described.

The CPU 21 includes a function of specifying a bar code area from the second image in a change area in which the disposition of a commodity was varied, and recognizing a bar code which the specified bar code area includes.

For example, the CPU 21 specifies an area, in which the first image and second image do not coincide, as a change area. For example, the CPU 21 determines the change area, based on similar pixels or dissimilar pixels. For example, the CPU 21 may determine the change area by surrounding, with a rectangular shape, an area where the density of dissimilar pixels in the first image and second image is high.

In addition, the CPU 21 may determine the change area by performing filling between dissimilar pixels by an expansion process, and executing a labeling process.

The method in which the CPU 21 specifies the change area is not limited to a specific method.

Next, an operation example of the commodity information processing apparatus 1 of the second embodiment is described.

Figure 6:
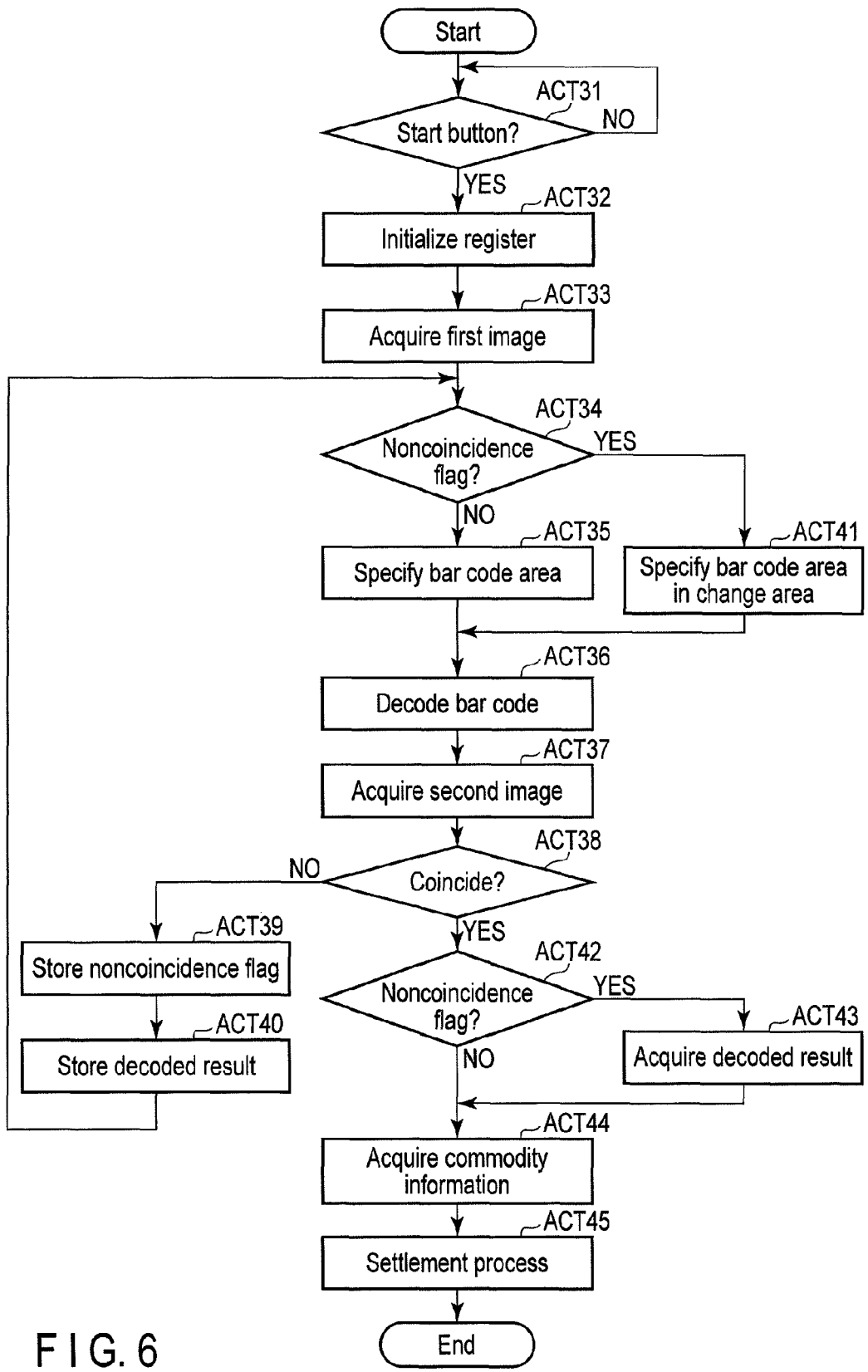
FIG. 6 is a flowchart illustrating an operation example of a commodity information processing apparatus according to a second embodiment.

FIG. 6 is a flowchart for describing an operation example of the commodity information processing apparatus 1 according to the second embodiment.

In this example, it is assumed that the CPU 21 sets in the RAM 23 a register which stores a noncoincidence flag indicating that the first image and second image do not coincide.

To start with, the CPU 21 determines whether the start button was pressed (ACT 31).

If the CPU 21 determines that the start button is not pressed (ACT 31, NO), the CPU 21 returns to ACT 31.

If the CPU 21 determines that the start button was pressed (ACT 31, YES), the CPU 21 initializes the register (ACT 32). Specifically, the CPU 21 does not set up a noncoincidence flag.

Upon initializing the register, the CPU 21 photographs the inside of the basket 10 by using the camera 3, and acquires a first image (ACT 33).

Upon acquiring the first image, the CPU 21 refers to the register and determines whether a noncoincidence flag is set up (ACT 34). If the CPU 21 determines that the noncoincidence flag is not set up (ACT 34, NO), the CPU 21 specifies a bar code area from the first image (ACT 35).

Upon specifying the bar code area, the CPU 21 decodes a bar code which the specified bar code area includes (ACT 36). Upon decoding the bar code, the CPU 21 photographs the inside of the basket 10 by using the camera 3, and acquires a second image (ACT 37).

Upon acquiring the second image, the CPU 21 determines whether the first image and the second image coincide (ACT 38). If the CPU 21 determines that the first image and the second image do not coincide (ACT 38, NO), the CPU 21 sets up a noncoincidence flag in the register (ACT 39). Upon setting up the noncoincidence flag, the CPU 21 stores the decoded result in ACT 36 in the RAM 23 (ACT 40).

Upon storing the decoded result, the CPU 21 returns to ACT 34.

If the CPU 21 determines that a noncoincidence flag is set up (ACT 34, YES), the CPU 21 specifies a bar code area in a change area (ACT 41). Upon specifying the bar code area in the change area, the CPU 21 goes to ACT 36. In this case, the CPU 21 decodes in ACT 36 a bar code which the bar code area of the change area includes. In addition, the CPU 21 acquires a third image in ACT 37. In ACT 38, the CPU 21 determines whether the second image and the third image coincide. If the second image and the third image do not coincide, the CPU 21 goes to ACT 39, and repeats the same operation.

If the CPU 21 determines that the first image and second image coincide (ACT 38, YES), the CPU 21 refers to the register and determines whether a noncoincidence flag is set up (ACT 42). If the CPU 21 determines that a noncoincidence flag is set up (ACT 42, YES), the CPU 21 acquires from the RAM 23 the decoded result stored in ACT 40 (ACT 43).

If the CPU 21 determines that the noncoincidence flag is not set up (ACT 42, NO) or if the CPU 21 acquired from the RAM 23 the decoded result stored in ACT 40 (ACT 43), the CPU 21 acquires commodity information corresponding to the decoded result of ACT 36 or/and the decoded result of ACT 43 (ACT 44).

Upon acquiring the commodity information, the CPU 21 executes a settlement process, based on the acquired commodity information (ACT 45). After executing the settlement process, the CPU 21 terminates the operation.

In the meantime, the CPU 21 may determine whether the first image and the second image coincide, after acquiring the commodity information.

In addition, if the second image and the third image do not coincide, the CPU 21 may issue a notification that the CPU 21 failed in the recognition process of the bar code.

Besides, when the CPU 21 determined a predetermined number of times in ACT 38 that the images do not coincide, the CPU 21 may issue a notification that the CPU 21 cannot detect the bar code.

The commodity information processing apparatus with the above-described structure executes, if the commodity was changed after the bar code recognition process, a bar code recognition process on the change area. As a result, the commodity information processing apparatus can execute the bar code recognition process on the changed commodity. Thus, the commodity information processing apparatus can execute the bar code recognition process at a higher speed.

Third Embodiment

Next, a third embodiment is described.

The commodity information processing apparatus 1 according to the third embodiment differs from the commodity information processing apparatus 1 according to the first embodiment in that the commodity information processing apparatus 1 of the third embodiment executes in parallel a recognition process of recognizing a bar code and a comparative determination process of comparing the first image and second image. Accordingly, the other structure is denoted by the same reference numerals, and a detailed description is omitted.

To begin with, functions which the CPU 21 realizes are described.

The CPU 21 includes a function of acquiring a second image at predetermined intervals. For example, the CPU 21 reacquires a second image in every second. For example, the CPU 21 photographs a commodity in the basket 10 by using the camera 3 at predetermined intervals, and acquires a second image. Incidentally, the CPU 21 may acquire the second image from an external apparatus at predetermined intervals.

In addition, the CPU 21 includes a function of determining whether the first image and second image coincide, each time the CPU 21 acquires the second image.

Moreover, the CPU 21 includes a function of specifying, if the first image and second image are noncoincident, a bar code area from the second image after specifying a bar code area from the first image, and recognizing a bar code which the specified bar code area includes.

Additionally, the CPU 21 includes a function of specifying, if the first image and second image are noncoincident, a bar code area from the second image after decoding a bar code which the bar code area of the first image includes, and recognizing a bar code which the specified bar code area includes.

Next, an operation example of the commodity information processing apparatus 1 of the third embodiment is described.

FIG. 7 is a flowchart for describing an operation example of the commodity information processing apparatus 1 of the third embodiment.

To start with, the CPU 21 determines whether the start button was pressed (ACT 51).

If the CPU 21 determines that the start button is not pressed (ACT 51, NO), the CPU 21 returns to ACT 51.

If the CPU 21 determines that the start button was pressed (ACT 51, YES), the CPU 21 photographs the inside of the basket 10 by using the camera 3, and acquires a first image (ACT 52).

Upon acquiring the first image, the CPU 21 executes in parallel a recognition process (ACT 53) of recognizing a bar code and a comparative determination process (ACT 54) of comparing the first image and second image. The recognition process and the comparative determination process will be described later in detail.

Upon executing the recognition process and the comparative determination process, the CPU 21 acquires commodity information corresponding to a decoded result (ACT 55).

Upon acquiring the commodity information, the CPU 21 executes a settlement process, based on the acquired commodity information (ACT 56). After executing the settlement process, the CPU 21 terminates the operation.

Incidentally, the recognition process and the comparative determination process may be executed by different hardware.

Next, operation examples of the recognition process and the comparative determination process are described.

In this example, the CPU 21 sets in the RAM 23 a register A which stores a coincidence flag indicating that the first image and second image coincide, and a noncoincidence flag indicating that the first image and second image do not coincide. In addition, the CPU 21 sets in the RAM 23 a register B which stores an end flag indicating that the recognition process ended. In the initial state, it is assumed that the register A stores the coincidence flag. In addition, in the initial state, it is assumed that the register B does not store the end flag.

To begin with, the operation example of the recognition process is described.

Figure 8:
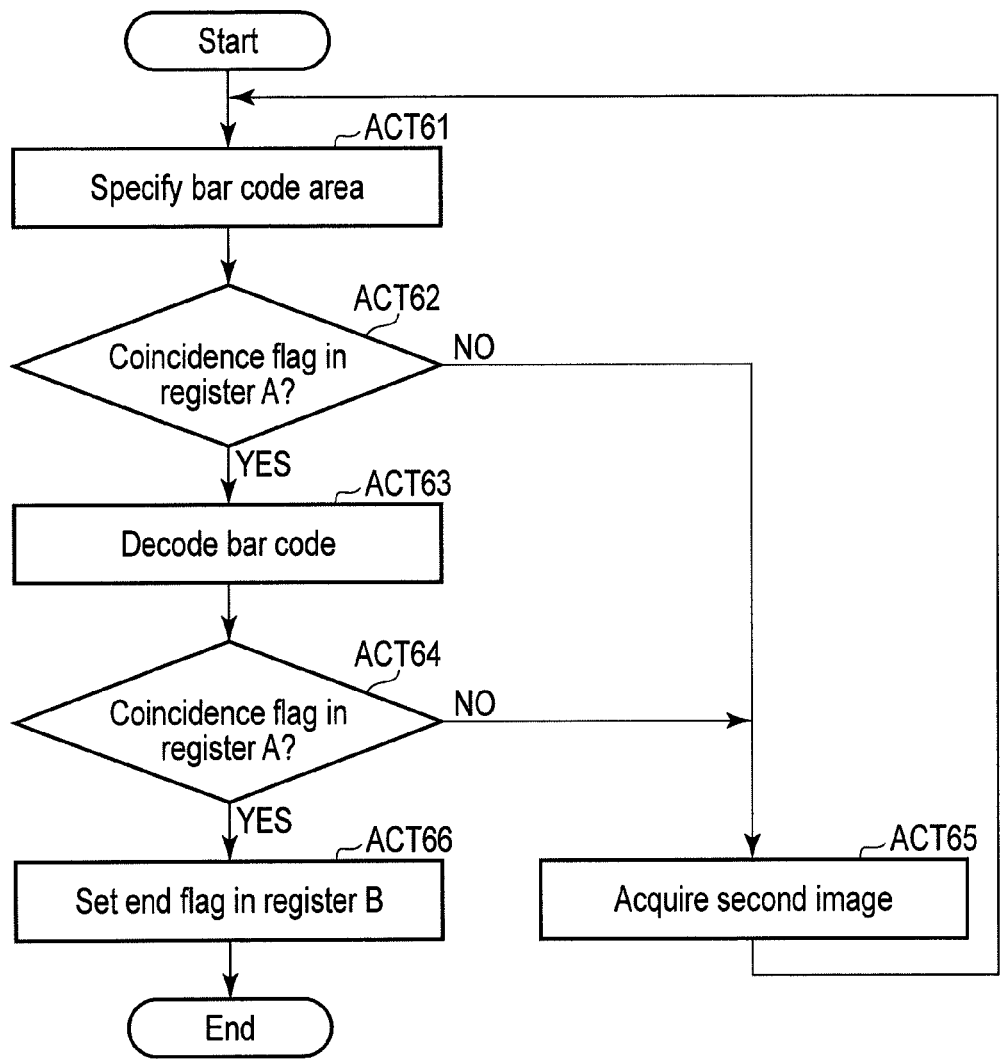
FIG. 8 is a flowchart illustrating an operation example of the commodity information processing apparatus of the third embodiment.

FIG. 8 is a flowchart for describing the operation example of the recognition process.

To start with, the CPU 21 specifies a bar code area in the first image (ACT 61). Upon specifying the bar code area, the CPU 21 determines whether a coincidence flag is set in the register A (ACT 62).

If the CPU 21 determines that a coincidence flag is set in the register A (ACT 62, YES), the CPU 21 decodes a bar code which the specified bar code area includes (ACT 63). Upon decoding the bar code, the CPU 21 determines whether a coincidence flag is set in the register A (ACT 64).

If the CPU 21 determines that a coincidence flag is not set (a noncoincidence flag is set) in the register A (ACT 62, NO) or if the CPU 21 determines that a coincidence flag is not set (a noncoincidence flag is set) in the register A (ACT 64, NO), the CPU 21 acquires a second image (ACT 65).

Upon acquiring the second image, the CPU 21 returns to ACT 61. In this case, the CPU 21 specifies in ACT 61 a bar code area from the second image. In addition, the CPU 21 recognizes in ACT 63 a bar code, which the specified bar code area includes, from the second image.

If the CPU 21 determines that a coincidence flag is set in the register A (ACT 64, YES), the CPU 21 sets an end flag in the register B (ACT 66).

Upon setting the end flag, the CPU 21 terminates the operation.

Next, the operation example of the comparative determination process is described.

Figure 9:
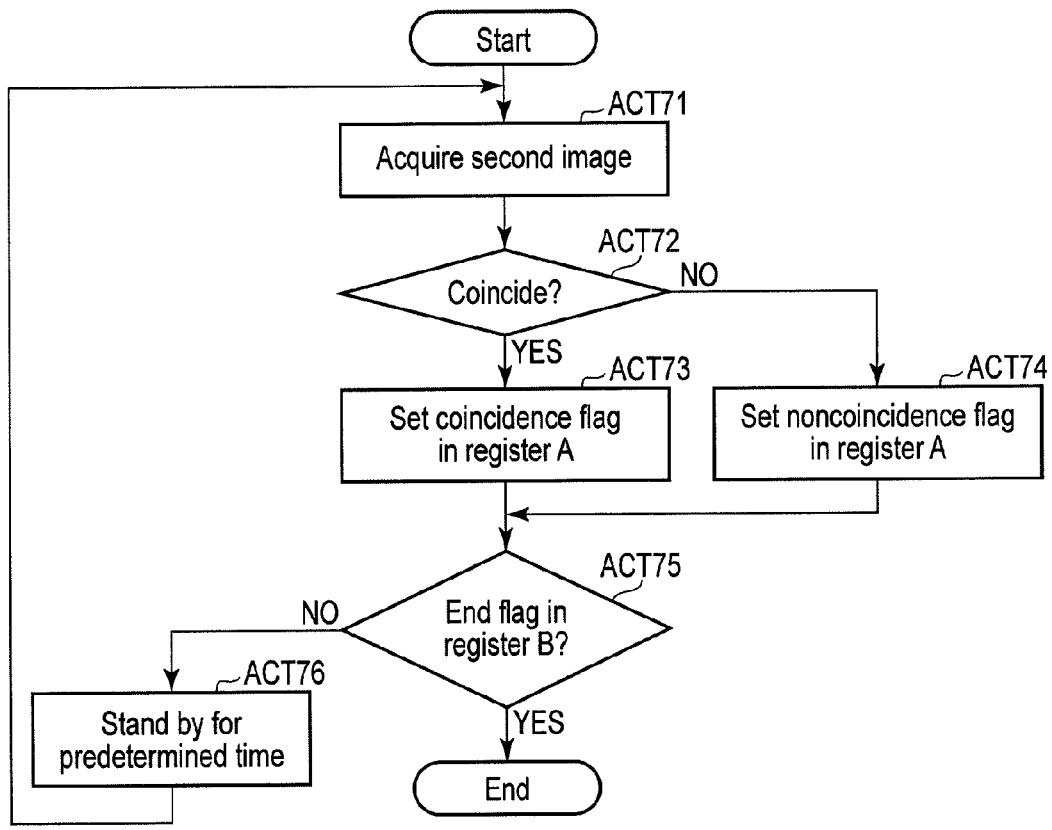
FIG. 9 is a flowchart illustrating an operation example of the commodity information processing apparatus of the third embodiment.

FIG. 9 is a flowchart for describing the operation example of the comparative determination process.

To start with, the CPU 21 acquires a second image (ACT 71). Upon acquiring the second image, the CPU 21 determines whether the first image and the second image coincide (ACT 72).

If the CPU 21 determines that the first image and the second image coincide (ACT 72, YES), the CPU 21 sets a coincidence flag in the register A (ACT 73). If the CPU 21 determines that the first image and the second image do not coincide (ACT 72, NO), the CPU 21 sets a noncoincidence flag in the register A (ACT 74).

If the CPU 21 sets the coincidence flag in the register A (ACT 73) or if the CPU 21 sets the noncoincidence flag in the register A (ACT 74), the CPU 21 determines whether an end flag is set in the register B (ACT 75).

If the CPU 21 determines that the end flag is not set in the register B (ACT 75, NO), the CPU 21 stands by for a predetermined time (ACT 76). After standing by for the predetermined time, the CPU 21 returns to ACT 71.

If the CPU 21 determines that the end flag is set in the register B (ACT 75, YES), the CPU 21 terminates the operation.

In the meantime, if the CPU 21 sets the noncoincidence flag in the register A in ACT 74, the CPU 21 acquires a third image in ACT 71.

In addition, the CPU 21 determines in ACT 72 whether the second image and third image coincide. Specifically, the CPU 21 determines whether the second image, which is being used in the recognition process, and the third image, which is acquired in ACT 761 at predetermined intervals, coincide or not.

If the CPU 21 determines that the second image and third image do not coincide, the CPU 21 goes to ACT 74, and repeats the same operation.

Incidentally, if the CPU 21 determines that the second image and the third image do not coincide, the CPU 21 may issue a notification that the CPU 21 cannot detect the bar code.

Besides, when the CPU 21 determined a predetermined number of times in ACT 72 that the images do not coincide, the CPU 21 may issue a notification that the CPU 21 cannot detect the bar code.

Furthermore, in the recognition process, the CPU 21 may determine whether a coincidence flag is set in the register A at predetermined intervals (e.g. in every second) by an interrupt process or the like.

In addition, the commodity information processing apparatus 1 according to the third embodiment may include the features of the commodity information processing apparatus 1 of the second embodiment.

The commodity information processing apparatus with the above-described structure can determine whether a commodity was changed during the recognition process. As a result, the commodity information processing apparatus can re-recognize the commodity more quickly. Thus, the commodity information processing apparatus can recognize the commodity at a higher speed.

Fourth Embodiment

Next, a fourth embodiment is described.

A commodity information processing apparatus 1 according to the fourth embodiment differs from the commodity information processing apparatus 1 of the first embodiment in that the commodity information processing apparatus 1 of the fourth embodiment determines that the first image and second image coincide, if the second image is the first image which was translated or rotated. Accordingly, the other structure is denoted by the same reference numerals, and a detailed description is omitted.

To begin with, functions which the CPU 21 realizes are described.

The CPU 21 includes a function of determining that the first image and second image coincide, if the second image is the first image which was two-dimensionally translated or rotated. For example, the CPU 21 determines whether the second image is the first image which was two-dimensionally translated or rotated, by using characteristic point matching or the like.

If the second image is the first image which was translated leftward, rightward, upward or downward, the CPU 21 determines that the first image and second image coincide. Similarly, if the second image is the first image which was translated obliquely, the CPU 21 determines that the first image and second image coincide.

In addition, if the second image is the first image which was rotated at any angle, the CPU 21 determines that the first image and second image coincide.

Besides, if the second image is the first image which was translated and rotated, the CPU may determine that the first image and second image coincide.

Figure 10A:
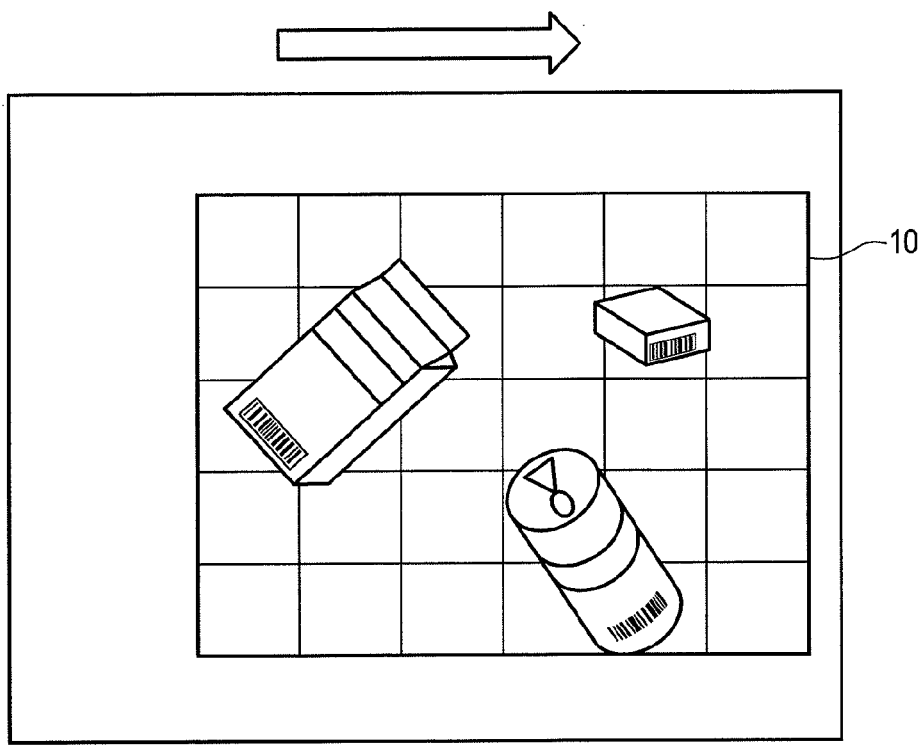
FIGS. 10A and 10B illustrate examples of images which a commodity information processing apparatus according to a fourth embodiment photographed.
Figure 10B:
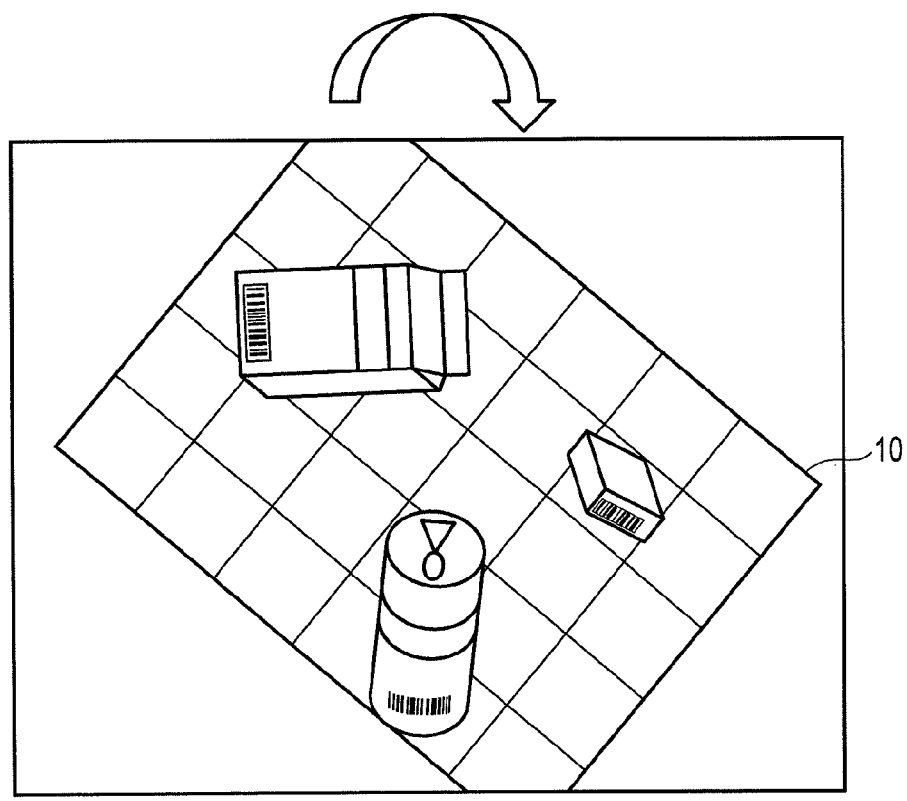

FIG. 10 illustrates examples of the second image which is the first image of FIG. 3 that was two-dimensionally rotated or translated.

Part (a) of FIG. 10 illustrates an example of the second image which is the first image that was two-dimensionally translated.

The second image illustrated in part (a) of FIG. 10 is an image corresponding to the first image translated rightward.

Part (b) of FIG. 10 illustrates an example of the second image which is the first image that was two-dimensionally rotated.

The second image illustrated in part (b) of FIG. 10 is an image corresponding to the first image rotated clockwise.

Next, an operation example of the commodity information processing apparatus 1 of the fourth embodiment is described.

Figure 11:
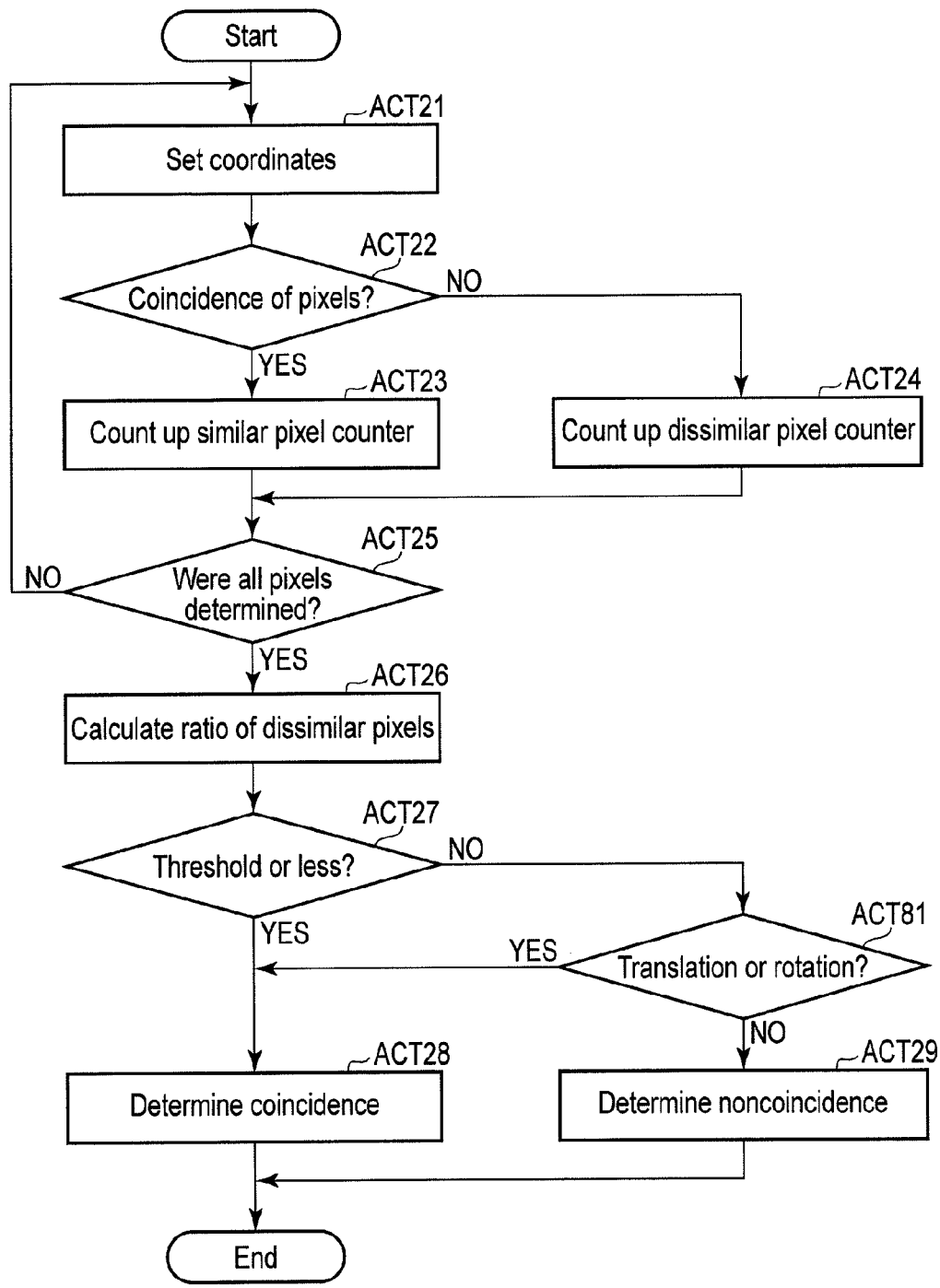
FIG. 11 is a flowchart illustrating an operation example of the commodity information processing apparatus of the fourth embodiment.

FIG. 11 is a flowchart for describing the operation example of the commodity information processing apparatus 1 of the fourth embodiment.

The operation example of the commodity information processing apparatus 1 of the fourth embodiment differs from the flowchart illustrated in FIG. 5 in that ACT 81 is added. Accordingly, the other steps are denoted by the same reference numerals, and a detailed description is omitted.

If the CPU 21 determines that the ratio of dissimilar pixels is not the predetermined threshold or less (ACT 27, NO), the CPU 21 determines whether the second image is the first image that was translated or rotated (ACT 81).

If the CPU 21 determines that the ratio of dissimilar pixels is the predetermined threshold or less (ACT 27, YES) of if the CPU 21 determines that the second image is the first image that was translated or rotated (ACT 81, YES), the CPU 21 determines that the first image and second image coincide (ACT 28).

If the CPU 21 determines that the second image is not the first image that was translated or rotated (ACT 81, NO), the CPU 21 determines that the first image and second image do not coincide (ACT 29).

In the meantime, the commodity information processing apparatus 1 according to the fourth embodiment may include the features of the commodity information processing apparatus 1 of the second embodiment, or the features of the commodity information processing apparatus 1 of the third embodiment.

The commodity information processing apparatus with the above-described structure does not re-execute the recognition process, when the basket 10 was translated or rotated during the recognition process. If the basket 10 is simply translated or rotated, the recognition result is unchanged, and therefore the commodity information processing apparatus can prevent unnecessary execution of the recognition process.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image recognition apparatus, comprising:
a camera interface; and
a controller configured to execute a decoding process on first and second images received through the camera interface in this order, by:
specifying a first pattern area within the first image,
decoding an identification pattern of an object included in the first pattern area,
carrying out determination of whether or not the first image and the second image match,
responsive to determining that the first image and the second image do not match, by the determination, specifying a second pattern area within the second image, and decoding an identification pattern of the object included in the second pattern area, and
responsive to determining that the first image and the second image match, by the determination, acquiring commodity information corresponding to the decoded identification pattern in the first pattern area.

2. The image recognition apparatus of claim 1, wherein the decoding process further includes specifying, within an area of the second image that does not match with a corresponding area of the first image, a third pattern area, and decoding at least an identification pattern included in the third pattern area.

3. The image recognition apparatus of claim 2, wherein the controller determines the non-matching area based on pixels of the first image and the second image within the third pattern area.

4. The image recognition apparatus of claim 1, wherein the controller is configured to repeatedly perform the decoding process on additional first and second images received from the camera interface in that order at predetermined intervals.

5. The image recognition apparatus of claim 1, wherein the specifying of the second pattern area and decoding of the identification pattern in the second pattern area are carried out after the specifying of the first pattern area or after the decoding of the identification pattern in the first pattern area.

6. The image recognition apparatus of claim 1, wherein the controller determines that the first image and the second image match, when the second image is a translated or rotated image of the first image.

7. The image recognition apparatus of claim 1, wherein the controller determines whether or not the first image and the second image match based on pixels of the first image and the second image.

8. The image recognition apparatus of claim 1, wherein the identification pattern of the object included in the first pattern area includes any one of a bar code, a QR code (Quick Response Code), a character, a numeral, a mark, and a feature value for object recognition.

9. A commodity information processing apparatus, comprising:
a camera interface; and
a controller configured to execute a settlement process based on first and second images received through the camera interface in this order, by:
specifying a first pattern area within the first image,
decoding an identification pattern of an object included in the first pattern area,
carrying out determination of whether or not the first image and the second image match,
responsive to determining that the first image and the second image do not match, by the determination, specifying a second pattern area within the second image, and decoding an identification pattern of the object included in the second pattern area,
responsive to determining that the first image and the second image match, by the determination, acquiring commodity information corresponding to the decoded identification pattern in the first pattern area, and
executing a settlement process based on the acquired commodity information.

10. An image recognition method, comprising:
acquiring a first image;
specifying a first pattern area within the acquired first image;
decoding an identification pattern of an object included in the first pattern area;
acquiring a second image after the acquisition of the first image;
carrying out determination of whether or not the first image and the second image match;
responsive to determining that the first image and the second image do not match, by the determination, specifying a second pattern area within the second image and decoding an identification pattern of the object included in the second pattern area, and
responsive to determining that the first image and the second image match, by the determination, acquiring commodity information corresponding to the decoded identification pattern in the first pattern area.

* * * * *